May 6, 1958  G. WHEAT  2,833,846
PLATES AND SEPARATORS FOR STORAGE BATTERIES
Filed Jan. 13, 1955  3 Sheets-Sheet 1
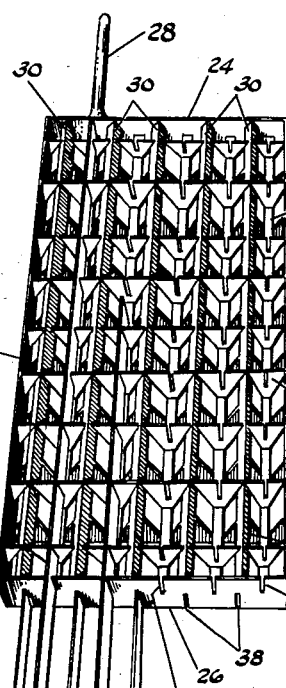
FIG. 1
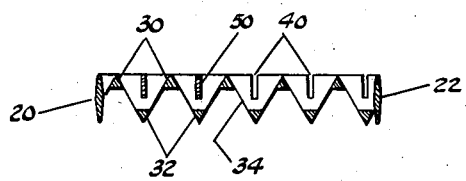
FIG. 2A
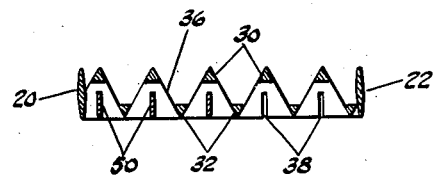
FIG. 2B
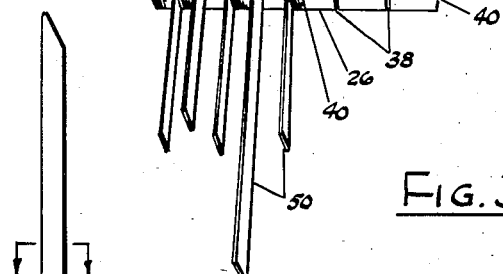
FIG. 3
FIG. 4
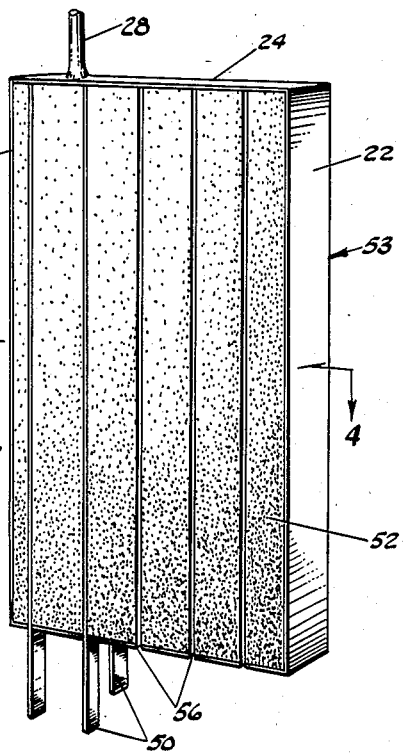
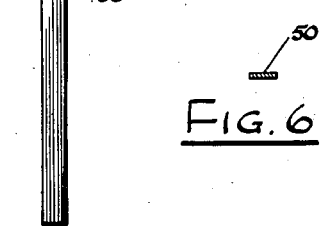
FIG. 5  FIG. 6
INVENTOR.
GRANT WHEAT
BY
AGENT May 6, 1958  G. WHEAT  2,833,846
PLATES AND SEPARATORS FOR STORAGE BATTERIES
Filed Jan. 13, 1955  3 Sheets-Sheet 2

INVENTOR.
GRANT WHEAT
BY
AGENT

May 6, 1958 G. WHEAT 2,833,846
PLATES AND SEPARATORS FOR STORAGE BATTERIES
Filed Jan. 13, 1955 3 Sheets-Sheet 3

INVENTOR.
GRANT WHEAT

United States Patent Office 2,833,846
Patented May 6, 1958

2,833,846

PLATES AND SEPARATORS FOR STORAGE BATTERIES

Grant Wheat, Marlboro, Mass., assignor to Koehler Manufacturing Company, Marlboro, Mass., a corporation of Massachusetts Application January 13, 1955, Serial No. 481,521

8 Claims. (Cl. 136—9)

This invention relates to non-spillable batteries such as mine safety batteries and the like, and in particular to the construction and arrangement of the positive grids and plates and associated separators for such batteries.

In a battery of the type described, the positive plate must be capable of withstanding considerable hard use. The grid, for example, must be strong enough to withstand shocks such as occur on the occasional dropping of the battery upon a stone surface. The positive plate must be as efficient as possible for its weight, since it is ordinarily carried on the back of the user. It must also have sufficient effective area to operate the bulb used with it, and to maintain a satisfactorily high voltage for at least a full working shift.

Since the positive plate is ordinarily the first component of the battery to fail, the positive plate of this invention must be so constructed as to provide a service life which is at least competitive with, or better than, other types of positive plates now available. Although batteries with five plates per cell have been used for mine lamps, the plates and separators of such batteries must be much thinner than those employed in a three plate design, and hence are less rugged and have a shorter life. In a three plate design one positive plate is used, and two negative plates each of which is spaced therefrom by a separator. These separators are constructed with a suitable degree of thickness and resiliency to protect the positive plate against sudden shocks, to absorb a sufficient amount of the electrolyte, and to provide effective insulation against creepage of the lead oxide powder between the positive and negative plates. The separator and plates will retain all the required electrolyte in suspension within their pores, except for a small amount, in the order of 15 cc. per cell, which is required to take the place of the amount lost by evaporation during the time between regular waterings. This time is usually one week.

While a single pasted positive plate can be made thick enough to hold the necessary volume of active material for the required capacity of the battery, such a plate would not have sufficient area to supply the required flow of current to the bulb and to maintain a sufficient voltage to give the required light.

In order to provide satisfactory capacity in small enough space, as in bateries for miners' lamps, it is customary to prepare the positive plate in the form of a row of contacting hollow cylinders of plastic material or hard rubber, provided with a large number of transverse slots, and having centrally-located electrically conductive spines connected together conductively at their ends, with the space inside the cylinders and around the spines being filled with active material which is tamped into place. While plates of this type have provided satisfactory performance for many years, they are relatively complicated and expensive.

Objects of this invention are to provide in a three plate battery a positive grid which will be strong enough to withstand rough usage and will have room for sufficient active material to give the desired battery capacity, a resulting positive plate having sufficient area to maintain an effective amount of current to light a powerful bulb for at least a full shift at a voltage equal to that of most five plate batteries, and separators effectively attached to the positive plate in such a way as to minimize free space between them and the plate and to protect the plate faces from shedding, all in a manner which is efficient and economical. Other objects are to provide positive grids and plates which are relatively simple to construct, and which are considerably less expensive than those now commonly used for the purpose. Still other objects will appear in the following description.

The objects of this invention are attained by providing a reticulated form of grid, onto which the active material is pasted in such a manner as to provide a number of slots in its surface. These slots are sufficient in area so that the total area of the pasted plate, including the area of the slots, is approximately equal to twice the area of the same plate unslotted. The resulting slotted plate is then faced on each side with a composition suitable for constituting a separator. This composition is molded, pressed, or otherwise formed and set into place by suitable means. Treeing between the positive and negative plates is prevented either by having the separator completely around the two sides, as well as over both faces, of the positive plates, or by having the separator material upon the faces only and also providing an insulating channel member surrounding the plate and separator edges. The resulting unitary plate and separators is then assembled, with a conventional negative plate on each side, into the battery, after which the electrolyte is added in the usual manner.

This invention will now be described in more detail in connection with the accompanying drawings which are to be considered as illustrative rather than limiting and in which:

Fig. 1 is a perspective view of a preferred form of reticulated grid, provided with slots to hold plastic strips around which active material is molded, some of these strips being shown in place;

Figs. 2A and 2B are cross-sectional views of the aforesaid grid, taken along lines 2A—2A and 2B—2B, respectively, of Fig. 1;

Fig. 3 is a perspective view of a pasted plate containing slots resulting from molding active material upon a grid such as that of Fig. 1 and with some of the slot-forming plastic strips in place;

Fig. 4 is a cross-sectional view of the aforesaid plate, taken along lines 4—4 of Fig. 3;

Fig. 5 is a side view of one of the aforesaid plastic strips;

Fig. 6 is a cross-sectional view of such strip taken along lines 6—6 of Fig. 5;

Figure 7:
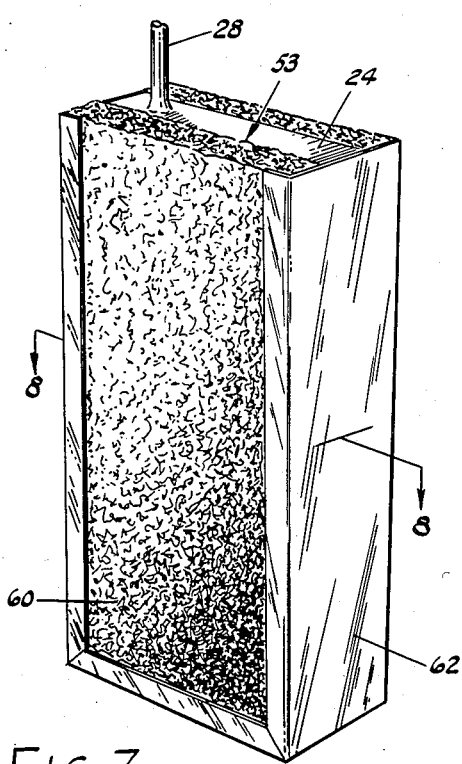
Fig. 7 is a perspective view of a pasted plate provided with a separator on each side and with an insulating channel around the edges of the resulting sandwich.

The grid shown in Figs. 1, 2A and 2B is made up of two side bars 20, 22, a top bar 24, a bottom bar 26, a lead 28 from the top bar to the positive terminal of the battery, a set of spines 30 arranged adjacent one face of the grid, another set of spines 32 arranged adjacent the other face of the grid, and a plurality of reinforcing ribs 34, 36 of zig-zag saw-tooth configuration positioned at right angles to the spines and extending between side bars 20 and 22. As shown, spines 30 are positioned at the apexes of the "teeth" of ribs 36 and the roots of the teeth of ribs 34, while spines 32 are positioned at the apexes of the teeth of ribs 34 and at the roots of the teeth of ribs 36. Thus the spines 30 are in staggered side-to-side relationship with respect to the spines 32. A set of slots 38 is provided in bottom bar 26, and in ribs 36 opposite spines 30, and another set of slots 40 is provided in bottom bar 26, and in ribs 34 opposite spines 32. These slots are preferably formed by cutting or sawing the grid after it has been cast.

Strips 50 are inserted into the slot 38 and 40 of the above-described grid. These strips are of a material which is non-adherent and inert to the active paste composition, and of appropriate strength and non-warping characteristics to permit of easy re-use. Some of the strips 50 are shown in position in Figs. 1, 2A, and 2B.

Active material 52, of the usual red lead and litharge type commonly used in batteries of the type herein described, is then pasted onto the two faces of the aforesaid grid, just covering the spines, to provide a finished plate 53 as shown in Figs. 3 and 4. Strips 50 are then pulled out lengthwise of the plate, immediately after the pasting operation, because if they are allowed to remain until the paste is thoroughly hardened they are likely to be "frozen" into position and cause some damage to the plate upon removal. Upon removal of strips 50, the resulting pasted plate contains slots or channels 54, 56, corresponding to slots 38, 40 respectively, of the grid. These slots or channels 54, 56 are of course opposite spines 30, 32 respectively. The total surface area of active material, both in the faces and in the slots and channels is, as near as practicable, double the area which the faces would have if they were unslotted; or, since the width of the slots is small, their area is substantially equal to that of the faces unslotted.

Figure 8:
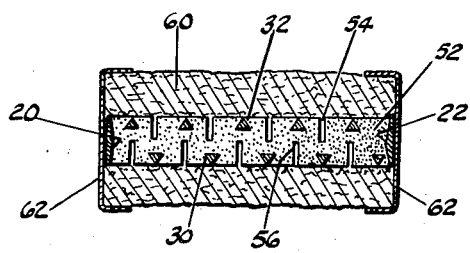
Fig. 8 is a cross-sectional view taken along lines 8—8 of Fig. 7.

The plate 53, constructed as described above, is then associated with separator material 60 of suitable characteristics. This separator material is molded onto both sides of the plate, as shown in Figs. 7 and 8, under sufficient pressure to permit adhesion but insufficient to damage the plate.

One such separator material is that disclosed in the co-pending application of Alton B. Poole, Serial No. 429,787, filed May 14, 1954.

Other types of separator material which may be used include known compositions based upon wood cellulose which has been treated to remove substances soluble in the battery electrolyte, and mixed with a suitable binder material, these constituents being mixed with water to suitable consistency. This separator composition may then be introduced into a mold form in which the positive plate has already been placed, and then molded or allowed to set around the plate.

An insulating channel member 62, of styrene plastic for example, is placed around the edges of the plate-separator sandwich to prevent treeing from the otherwise exposed edges of the positive plate to the negative plate on either side.

Alternatively, separator material may be molded entirely around the positive plate (see Fig. 9), including side bars 20, 22 and bottom bar 26. The covering of top bar 24 with separator material is not necessary, but may be done if desired. In such case, insulating member 62 is omitted as treeing will not occur if the separator material is properly applied.

Figure 9:
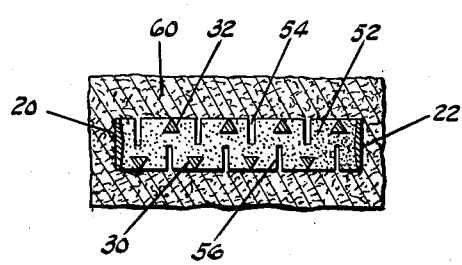
Fig. 9 is a cross-sectional view similar to Fig. 8, but showing the separator material surrounding the plate rather than only on the two faces as in Fig. 8.

The configuration shown in Fig. 9 will of course require a somewhat larger battery case or jar, for the same size of positive plate, than that shown in Fig. 8; conversely, if the same size battery case is used for each configuration, that shown in Fig. 9 will provide a smaller positive plate and hence less capacity. Obviously, various sizes and shapes of case and plate can be used to suit particular requirements.

Figure 11:
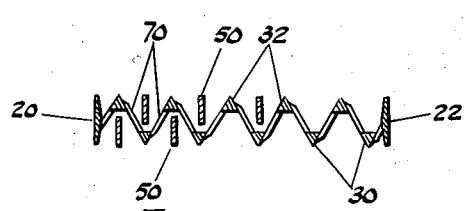
Fig. 11 is a cross-sectional view of the latter grid taken along lines 11—11 of Fig. 10.
Figure 10:
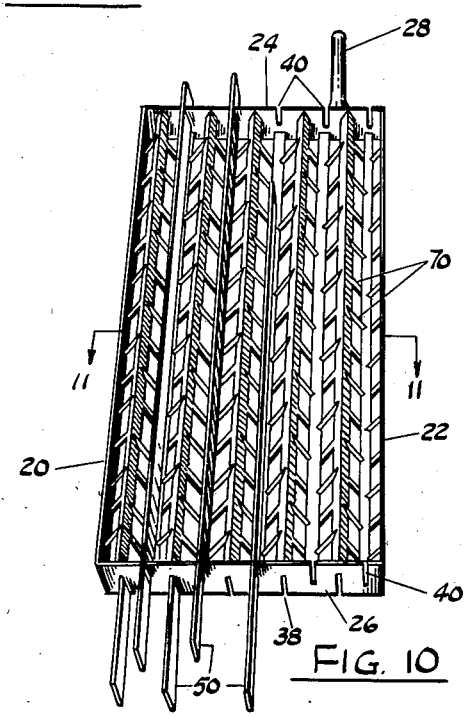
Fig. 10 is a perspective view of another form of reticulated grid.

Another form of grid is shown in Figs. 10 and 11. This form is essentially identical with that of Figs. 1, 2A and 2B—like members referring to like parts—except for the rib members and for the slotting of the top bar 24. The rib members of this type of grid, represented by the numeral 70, extend between side bars 20, 22 in zig-zag formation in the form of thin members running from spine to spine, and hence they zig-zag from the vicinity of one face of the grid to the vicinity of the other, as indicated in Fig. 11. Obviously, therefore, the ribs in this form of grid do not provide any effective support or positioning for the strips 50. Hence both the top bar 24 and the bottom bar 26 must be slotted in order to provide proper positioning for strips 50.

The grid of Figs. 10 and 11, while suitable for many purposes, does lack some of the points of superiority of the grid of Figs. 1, 2A and 2B—since in the latter, the strips 50 can be accurately positioned and held while the paste is applied, and the grid is structurally stronger both because of the rib configuration and because top bar 24 is not slotted.

Figure 12:
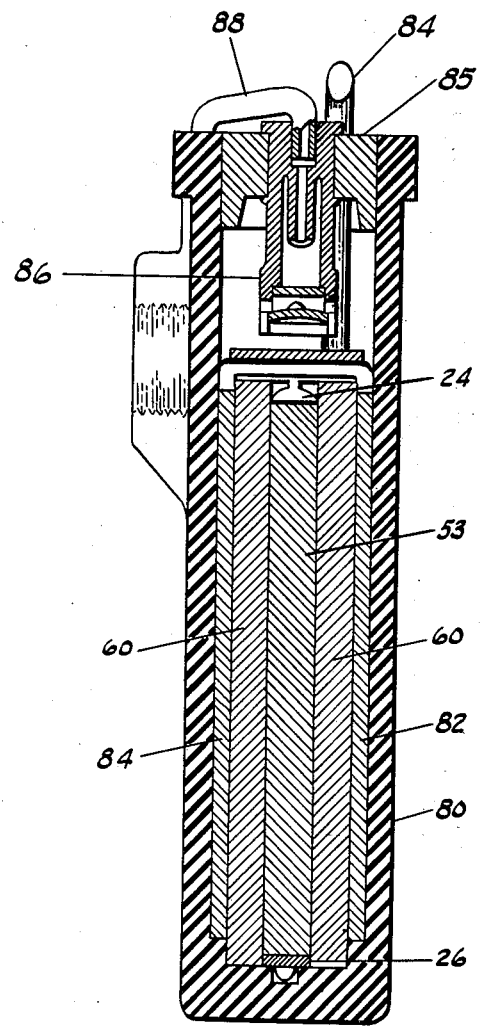
Fig. 12 is a view, in vertical section, of a type of non-spillable storage battery for which the present invention is particularly suitable.

A typical battery containing the positive plate and associated separators of this invention is shown in Fig. 12, in cross-section. In Fig. 12, numeral 80 represents a battery case or jar made of any suitable material customarily used for this purpose, such as plastic or rubber compositions. Within this case 80 are positioned positive plate 53, associated separators 60, and negative plates 82, 84, one on each side of and in contact with a separator 60. These negative plates may be of conventional construction. As indicated, the space between the battery case walls is fully occupied by plates and separators, so that there is substantially no electrolyte present other than that absorbed and adsorbed in the plates and separators, plus a small amount present just above the plates and separators. Case 80 is provided with a cover 85 through which extend the usual leads (one of which is indicated at 84) from the positive and the negative plates to the outside of the battery. A suitable non-spilling device, such as that shown at 86, with a vent 88, is also provided.

The grids herein described are commonly cast or molded from lead-antimony alloy of a type ordinarily used in batteries of the class referred to herein.

Various modifications will occur to those skilled in this art, but the scope of this invention is intended to be limited only as set forth in the appended claims.

I claim:

1. A positive plate grid adapted for use in a storage battery of the non-spillable type, comprising two side bars, a top bar and a bottom bar connecting the top and bottom ends, respectively, of said side bars, a plurality of spines of smaller cross-sectional area than said side bars positioned between said side bars and each extending from said top bar to said bottom bar, said spines being arranged in staggered side-to-side relation and being strengthened by a plurality of reinforcing ribs extending in zig-zag configuration from each one of said spines to the next and to the bars at either side, said ribs and said bottom bar being adapted to receive strips around which active material will be pasted, each of said strips running lengthwise of said grid and being opposite one of said spines.

2. A positive plate adapted for use in a storage battery of the non-spillable type, comprising a reticulated grid, constructed in accordance with claim 1, filled with active material covering said grid to form two parallel faces, each of said faces being provided with slots the total area of which slots is substantially equal to that of the area of said two faces without said slots.

3. A positive plate grid adapted for use in a storage battery of the non-spillable type, comprising two side bars, a top bar and a bottom bar connecting the top and bottom ends, respectively, of said side bars, two sets of parallel spines positioned between said side bars and parallel thereto, each such spine extending from said top bar to said bottom bar, one set of said spines being positioned adjacent one face of said grid and the other set of said spines being positioned adjacent the other face of said grid, the spines of each such set being in staggered relation with the spines of the other set, and a plurality of reinforcing ribs extending substantially at right angles to said spines and in zig-zag configuration from each one of said spines to the next and to the bars at either side.

4. A positive plate adapted for use in a storage battery of the non-spillable type, comprising a reticulated grid, constructed in accordance with claim 3, filled with active material covering said grid to form two parallel faces, each of said faces being provided with slots the total area of which slots is substantially equal to that of the area of said two faces without said slots.

5. A positive plate grid adapted for use in a storage battery of the non-spillable type, comprising two side bars, a top bar and a bottom bar connecting the top and bottom ends, respectively, of said side bars, two sets of parallel spines of smaller cross-sectional area than said side bars positioned between said side bars and parallel thereto, each such spine extending from said top bar to said bottom bar, one set of said spines defining one face of said grid and the other set defining the other face, the spines of each such set being in staggered relation with the spines of the other set, and a plurality of reinforcing ribs extending substantially at right angles to said spines and in zig-zag, saw-tooth configuration between the bars at either side, the teeth of each alternate rib facing in the opposite direction, and the apexes of said teeth engaging the spines, said ribs and said bottom bar being slotted to receive strips around which positive plate composition may be pasted, said slots being arranged in rows parallel to said side bars, each such row being opposite one of said spines.

6. A positive plate adapted for use in a storage battery of the non-spillable type, comprising a reticulated grid, constructed in accordance with claim 5, filled with active material covering said grid to form two parallel faces, each of said faces being provided with slots the total area of which slots is substantially equal to that of the area of said two faces without said slots, said parallel faces and the surfaces of said slots consisting substantially entirely of said active material.

7. A positive plate adapted for use in a storage battery of the non-spillable type, comprising a reticulated grid and active material covering said grid to form two parallel faces, each of said faces being provided with slots the total area of which slots is substantially equal to that of the area of said two faces without said slots, said parallel faces and the surfaces of said slots consisting substantially entirely of said active material.

8. A positive plate adapted for use in a storage battery of the non-spillable type, comprising a reticulated grid filled with active material, said active material covering said grid to form two parallel faces, each of said faces being provided with parallel slots, the slots on one of said faces being positioned in staggered relation with respect to the slots on the other of said faces, the total area of all said slots being substantially equal to that of the total area of said two faces without said slots, said parallel faces and the surfaces of said slots consisting substantially entirely of said active material.

References Cited in the file of this patent

UNITED STATES PATENTS

| | | |
|---|---|---|
| 1,236,672 | Chamberlain | Aug. 14, 1917 |
| 1,451,058 | Shatzke | Apr. 10, 1923 |
| 1,772,541 | Gage | Aug. 12, 1930 |
| 2,294,427 | Spicer | Sept. 1, 1942 |

FOREIGN PATENTS

| | | |
|---|---|---|
| 5,321 | Great Britain | of 1900 |

OTHER REFERENCES

Willard Catalog, 3,211, October 1947.